(12) United States Patent
Rodriguez et al.

(10) Patent No.: US 10,383,423 B2
(45) Date of Patent: Aug. 20, 2019

(54) TWISTED TOOTH COMB APPARATUS

(71) Applicants: Maria E. Rodriguez, Carpentersville, IL (US); Mauricio E. Rodriguez, Carpentersville, IL (US)

(72) Inventors: Maria E. Rodriguez, Carpentersville, IL (US); Mauricio E. Rodriguez, Carpentersville, IL (US)

(73) Assignee: Maria E. Rodriguez, Carpentersville, IL (US)

( * ) Notice: Subject to any disclaimer, the term of this patent is extended or adjusted under 35 U.S.C. 154(b) by 466 days.

(21) Appl. No.: 15/214,055

(22) Filed: Jul. 19, 2016

(65) Prior Publication Data
US 2018/0020801 A1  Jan. 25, 2018

(51) Int. Cl.
| | | |
|---|---|---|
| A45D 24/24 | (2006.01) |
| A45D 24/32 | (2006.01) |
| A45D 24/30 | (2006.01) |
| A45D 24/04 | (2006.01) |
| A01K 13/00 | (2006.01) |
| A46B 11/00 | (2006.01) |
| A45D 19/02 | (2006.01) |

(52) U.S. Cl.
CPC ............ *A45D 24/24* (2013.01); *A01K 13/002* (2013.01); *A45D 24/04* (2013.01); *A45D 24/30* (2013.01); *A45D 24/32* (2013.01); *A46B 11/0013* (2013.01); *A45D 2019/025* (2013.01)

(58) Field of Classification Search
CPC ........ A45D 24/32; A45D 24/22; A45D 24/24; A45D 24/26; A45D 24/28; A45D 2019/025; A46B 11/001; A46B 11/0013; A46B 11/002; A46B 15/0053; A46B 2200/104; A01K 13/002; A01K 13/003
USPC ......... 132/112, 113, 114, 125, 160, 901, 148
See application file for complete search history.

(56) References Cited

U.S. PATENT DOCUMENTS

| | | | | |
|---|---|---|---|---|
| 629,703 | A * | 7/1899 | Swindell .................. | A45D 8/12 132/158 |
| 2,128,183 | A * | 8/1938 | Hickey ................... | A45D 24/26 132/111 |
| 4,287,898 | A * | 9/1981 | Konesky ................ | A45D 24/08 132/141 |
| 5,975,089 | A * | 11/1999 | Simon .................... | A45D 24/26 132/112 |

(Continued)

FOREIGN PATENT DOCUMENTS

| | | | | |
|---|---|---|---|---|
| WO | WO 9503725 | * | 2/1995 | ............. A45D 24/32 |

*Primary Examiner* — Tatiana L Nobrega
(74) *Attorney, Agent, or Firm* — McDonnell Boehnen Hulbert & Berghoff LLP

(57) ABSTRACT

Examples relating to twisted teeth combs are described herein. An example apparatus may include a base with one or more twisted teeth attached. Particularly, each twisted tooth may have a twisted structure, such as a structure similar to a twist drill bit used by a power drill. As such, the arrangement of the teeth on the apparatus can vary within examples. For instance, the apparatus can include straight teeth and twisted teeth arranged in an alternating order. Additionally, in some implementations, an example apparatus relating to twisted teeth combs can include one or more components, such as a handle connected to the base and/or a storage compartment configured to receive and hold liquids (e.g., hair gel) or substances.

3 Claims, 3 Drawing Sheets

(56) References Cited

U.S. PATENT DOCUMENTS

| | | | |
|---|---|---|---|
| 6,962,158 B1* | 11/2005 | Anguelo | A45D 24/22 |
| | | | 132/113 |
| D533,355 S * | 12/2006 | Rusk | D4/132 |
| 2001/0035191 A1* | 11/2001 | Lee | A46B 9/023 |
| | | | 132/160 |
| 2002/0139383 A1* | 10/2002 | Christensen | A45D 19/02 |
| | | | 132/114 |
| 2012/0234342 A1* | 9/2012 | Sanz | A45D 24/30 |
| | | | 132/219 |
| 2014/0048088 A1* | 2/2014 | Tan | A45D 24/28 |
| | | | 132/112 |
| 2015/0265025 A1* | 9/2015 | Alsalameh | A45D 24/22 |
| | | | 132/113 |
| 2016/0286929 A1* | 10/2016 | Delabastide | A45D 24/26 |

* cited by examiner

TWISTED TOOTH COMB APPARATUS

BACKGROUND

A comb is a tool that typically includes several teeth arranged for styling and managing hair. Combs have several uses, including for cleaning and managing the hair and scalp of a person. As such, combs are often made out of plastic, metal, or wood and can vary in size.

SUMMARY

The present disclosure describes examples relating to twisted teeth combs. An example apparatus can include a base with one or more twisted teeth attached. Particularly, each twisted tooth can have a twisted structure, such as a structure similar to a twist drill bit used by a power drill. As such, the arrangement of the teeth on the apparatus can vary within examples. For instance, the apparatus can include straight teeth and twisted teeth arranged in an alternating order. Additionally, in some implementations, an example apparatus relating to twisted teeth combs can include one or more components, such as a handle connected to the base and/or a storage compartment configured to receive and hold hair gel or other liquids.

In a first aspect, an example apparatus is disclosed. The apparatus may include a base and a plurality of teeth coupled to the base. In some instances, teeth of the plurality of teeth are arranged incrementally and coupled to the base, and the plurality of teeth further comprises at least one tooth having a twisted structure.

In a second aspect, another example apparatus for combing hair is disclosed. The apparatus may include a base and a plurality of teeth coupled to the base. In some instances, the teeth of the plurality of teeth are arranged incrementally in a row and extend in a perpendicular direction from the base. The plurality of teeth can comprise at least one tooth having a twisted structure and at least one tooth having one or more slots. In some instances, teeth can have both a twisted structure and one or more slots.

In a further aspect, an additional example apparatus is disclosed. The apparatus may include a base comprising a compartment for receiving and holding liquid via an access point and a plurality of teeth coupled to the base. In some instances, teeth of the plurality of teeth are arranged incrementally in a row and extend in a direction perpendicular to the base. The plurality of teeth may comprise at least one tooth comprising a plurality of portions. In some instances, at least one portion of the plurality of portions can have a twisted structure, and at least one tooth can have one or more slots configured to disperse liquid from the compartment of the base during use of the apparatus.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
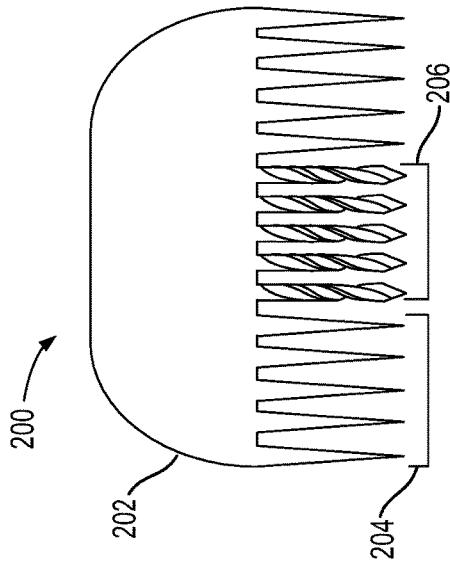
FIG. 1 illustrates an example apparatus having an alternate tooth configuration.

The following detailed description describes various features and functions of the disclosed systems and methods with reference to the accompanying Figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the Figures may be used in combination with one another. Thus, the Figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

As discussed above, a comb may be used to style, clean, and manage hair. For instance, a person may use a comb to style his or hair in a particular manner. A comb can also be used for other purposes, such as combing the fur of a dog or cat. However, in some instances, a person's hair or an animal's fur can have knots or tangles that make using a straight-toothed comb difficult. Particularly, the straight teeth of the comb may fail to comb out the knots or tangles in the hair or fur. A straight-tooth comb can also fail to remove debris (e.g., dandruff) located in the hair or fur during use.

Disclosed herein are examples relating to twisted teeth combs that may overcome potential deficiencies of a straight-toothed comb. To illustrate, an example apparatus may be configured with a base that includes at least one twisted tooth attached. For instance, the base of an apparatus may have a rectangular configuration that includes at least one or more twisted teeth arranged incrementally in a row (e.g., equal spacing between teeth) extending in a perpendicular direction from the base. As indicated above, at least some of the teeth of the apparatus can have a twisted or spiral configuration, which may vary within examples. For instance, an example of a twisted tooth may have a structure that matches or resembles the structure of a twist drill bit that is often used by a power drill. A twisted tooth can also have other configurations within examples, such as a helical twist configuration or partially twisted. As such, an example apparatus configured for combing hair or fur can include multiple types of teeth, including twisted teeth and straight teeth, among other possibilities.

In some examples, an apparatus for combing hair or fur may further include a compartment configured to receive and hold liquid and/or other mixtures (e.g., hair gel, hair dye). Particularly, the compartment may connect to the base and can include an access point (i.e., an opening) that enables transfer of materials in and out of the compartment. In some instances, the access point may further include a closing mechanism (e.g., a twist cap) configured to prevent the contents within the compartment from spilling out. In an example implementation, an apparatus may include one or more prefilled compartments. For instance, an apparatus may include hair gel already stored in the compartment enabling the compartment to not require an access point.

An example apparatus configured with one or more compartments may further include one or more teeth that include inner channels connected to a given compartment and one or more slots in the exterior structure of the tooth. This way, the contents of a compartment can flow through the inner channels and out of the slots of given teeth during use of the apparatus. For instance, an apparatus with hair gel stored in a compartment can be used by a person that wants to have a distribution of hair gel within his hair during use of the apparatus.

In another example, an apparatus may include an empty compartment that can serve as a place to collect dander and/or other debris during use of the apparatus. The compartment can be the same compartment discussed above that may serve as storage for liquid or other materials. As such, an empty compartment positioned on an apparatus can serve as storage for dandruff or other substances collected from hair or fur during use of the apparatus. For instance, as a person combs his hair, debris may enter the empty compartment of the apparatus through slots positioned in teeth of the apparatus.

Moreover, in some example implementations, an example apparatus can include one or more other components, such as a vacuum component connected to the base that is configured to provide force that draws debris through slots in the teeth of the apparatus during use.

Referring to the Figures, FIG. 1 illustrates an example apparatus having an alternate tooth configuration. Particularly, apparatus 100 includes base 102 and two types of teeth, such as straight tooth 104 and twisted tooth 106. In other examples, apparatus 100 can have other configurations, including more or less teeth or a shorter or longer base 102. Apparatus 100 can also include multiple rows of teeth connected to base 102 in some instances. For example, apparatus 100 can include two rows of teeth with one row of teeth positioned in an offset manner behind the other row of teeth.

Base 102 corresponds to a physical structure that can be held during use of apparatus 100. As such, teeth are shown connected and extending from base 102 in a perpendicular direction, but can connect and extend from base 102 in other directions within examples. Base 102 is shown having a curved configuration, but can have other configurations, such as a rectangular configuration.

As indicated above, the teeth of apparatus 100 includes a combination of straight teeth (e.g., straight tooth 104) and twisted teeth (e.g., twisted tooth 106). In particular, apparatus 100 is shown in FIG. 1 with straight tooth 104 and another straight tooth positioned on the ends of the array of teeth, and sets of two straight teeth positioned in between each twisted tooth 106. However, in other examples, apparatus 100 can include straight teeth and twisted teeth arranged in different orders, which may involve apparatus 100 including more or less twisted teeth.

As previously discussed herein, twisted teeth (e.g., twisted tooth 106) can have various twisted configurations within examples. For instance, twisted tooth 106 is shown having a configuration similar to a twist drill bit that is often used by a power drill. In another example, twisted tooth 106 may include multiple portions with one or more of the multiple portions having a twisted configuration. For instance, twisted tooth 106 may be divided into three portions with only the end portion located farthest away from base 102 having a twisted configuration. Additionally, twisted tooth 106 and other twisted teeth of apparatus 100 can have other configurations, such as a helical or curled configuration.

Figure 2:
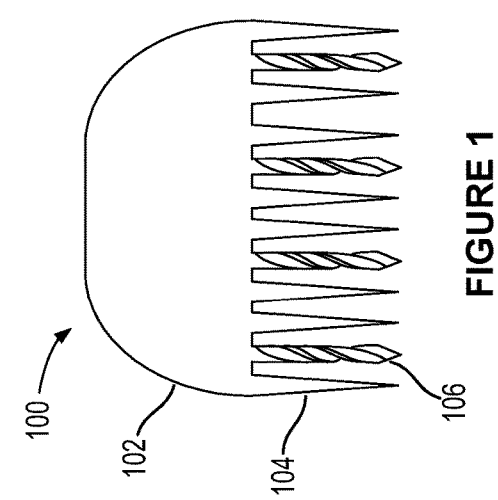
FIG. 2 illustrates another example apparatus having a grouped teeth configuration.

FIG. 2 illustrates another example apparatus having a grouped teeth configuration. As shown, apparatus 200 includes base 202, straight teeth 204, and twisted teeth 206. Apparatus 200 is similar to apparatus 100 shown in FIG. 1, but includes teeth that are arranged in a different configuration. Particularly, apparatus 200 includes a set of twisted teeth 206 containing five twisted teeth positioned between two sets of straight teeth (e.g., straight teeth 204) with each set containing five straight teeth. As such, the configuration of teeth coupled to base 202 may enable particular styling or otherwise manipulation of a person's hair or an animal's fur that differs from other combs.

In other examples, apparatus 200 can include other types of teeth, including more or less teeth, etc. Additionally, the arrangement of the teeth on apparatus 200 can vary in other examples. For instance, apparatus 200 can include multiple rows of teeth that can assist in removing tangles or knots from hair or fur.

Figure 3:
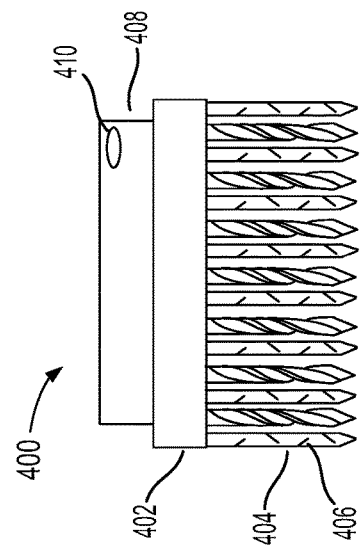
FIG. 3 illustrates an example apparatus having twisted teeth.

FIG. 3 illustrates an example apparatus having twisted teeth. Apparatus 300 includes base 302 and twisted teeth (e.g., twisted tooth 304). As shown, base 302 includes a rectangular configuration, but may include other configurations within examples. For instance, base 302 can include a handle that extends from base 302.

Apparatus 300 is shown having uniform twisted teeth, but can include different types of twisted configurations. For instance, apparatus 300 may include three types of teeth aligned in an alternating arrangement connected to base 302.

Figure 4:
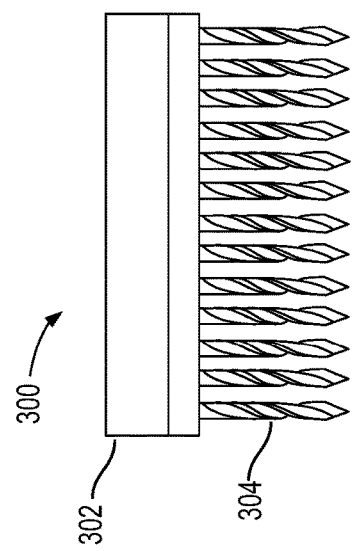
FIG. 4 illustrates an example apparatus configured with a compartment and slotted teeth.

FIG. 4 illustrates an example apparatus configured with a compartment and slotted teeth. As shown, apparatus 400 includes base 402 configured with a combination of types of teeth (e.g., tooth 404). A portion of the teeth, such as tooth 404, include slots (e.g., slot 406). Apparatus 400 further includes compartment 408 configured with access point 410 connected to base 402. In other implementations, apparatus 400 can include more or less components, such as an additional compartment. Furthermore, the size and configuration of apparatus 400 may vary in examples.

Base 402 includes teeth connected and extending away in a uniform manner. As shown, alternating teeth of apparatus 400 (e.g., tooth 404) include one or more slots (e.g., slot 406) extending inward. In particular, slot 406 and other slots are positioned at slanted angles along each tooth, but may have different orientations relative to a given tooth within other examples. For instance, slot 406 can have a horizontal orientation relative to tooth 404. Additionally, in some implementations, slots extending into the teeth can each have a different orientation. Further, each tooth of apparatus 400 includes a solid end positioned on the end of the tooth, but can include an opening in other examples. In some implementations, the twisted teeth can also include slots as well.

As shown in FIG. 4, compartment 408 can be connected to base 402 and may further include access point 410 that enables access to compartment 408. As such, compartment 408 may be configured to receive and hold various materials, including liquid or other materials. For instance, compartment 408 may hold and store hair gel, shampoo, hair dye, among other possible options. The size and position of compartment 408 can vary in examples. As an example, compartment 408 can be configured in base 402 rather than an additional attachment. In some instances, compartment 408 can be removed and reattached to base 402.

Access point 410 can be configured to provide access to the inside of compartment 408. For instance, compartment 408 may receive materials or liquids through access point 410. In some implementations, access point 410 may include a mechanism that enables opening and closing access point 410. By way of an example, access point 410 may include a cap that twists on and off to close access point 410. Other examples of mechanisms may be used within examples.

As discussed above, compartment 408 may receive and hold materials through the use of access point 410. Compartment 408 may further include one or more inner channels that enable materials or liquids to transfer from compartment 408 through base 402 into teeth of apparatus 400. Particularly, one or more teeth, such as tooth 404, may include inner channels that extend from compartment 408 through the tooth so that slots (e.g., slot 406) can release liquids (e.g., hair gel, shampoo, hair dye) from compartment 408 of apparatus 400 into a person's hair or an animal's fur.

As an example illustration, compartment 408 may receive and hold hair gel via access point 410 so that while a person uses apparatus 400 to comb his hair, the hair gel in compartment 408 may flow through base 402 into the teeth (e.g., tooth 404) and out of slots (e.g., slot 406) positioned in the teeth. This way, the person may utilize apparatus 400 to apply gel to his hair while also styling his hair. The positioning of slots across different teeth of apparatus 400 can help distribute hair gel uniformly during use of apparatus 400.

Figure 5:
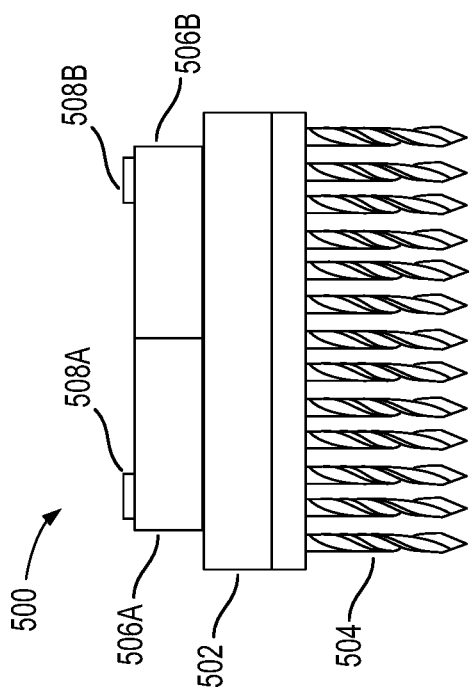
FIG. 5 illustrates an example apparatus having duel compartments and slotted teeth.

FIG. 5 illustrates an example apparatus having duel compartments and slotted teeth. As shown, apparatus 500 includes base 502, twisted teeth (e.g., twisted tooth 504), and multiple compartments (i.e., compartment 506A and compartment 506B). Similar to compartment 408 of apparatus 400, compartment 506A includes access point 508A and compartment 506B includes access point 508B. Although apparatus 500 includes compartments 506A-506B, apparatus 500 can include more or less compartments in other examples.

Base 502 is shown in FIG. 5 as a physically distinct structure from compartments 506A-506B, but these components may be combined in another example implementation. Particularly, base 502 may include one or more compartments (e.g., compartments 506A-506B) built internally within base 502 as a single structure rather than compartments coupled to base 502. Base 502 can include grips, handles, or have other configurations within examples.

Twisted teeth, such as twisted tooth 504, can connect to base 502 in different ways. For instance, apparatus 500 can include multiple rows of twisted teeth rather than a single row as illustrated in FIG. 5. In further examples, apparatus 500 may include more or less teeth, including different types of teeth. Additionally, in some implementations, apparatus 500 may be configured to include interchangeable sets of teeth. For instance, apparatus 500 may be configured to enable a change between a set of twisted teeth with a set of straight. As a result, a user can customize apparatus 500 as desired.

As shown, apparatus 500 includes compartment 506A configured with access point 508A and compartment 506B configured with access point 508B. As an example application involving apparatus 500, compartment 506A may receive and hold a first liquid (e.g., black hair dye) via access point 508A and compartment 506B may receive and hold a second liquid (e.g., red hair dye) via access point 508B. During use of apparatus 500, the first liquid and the second liquid (e.g., the black and red hair dyes) may be applied to a person's hair through the use of channels and slots in the twisted teeth (e.g., twisted tooth 504).

In another example implementation, compartment 506A and compartment 506B may serve as containers for holding liquid, mixtures, or other materials for a user to access upon demand. Particularly, compartment 506A and compartment 506B may hold liquids (e.g., shampoo, hair gel) that a user may access through access points 508A-508B, respectively, when the user desires. For instance, the user may comb his hair using apparatus 500 and then later utilize hair gel positioned in compartment 506A via access point 508A.

Figure 6:
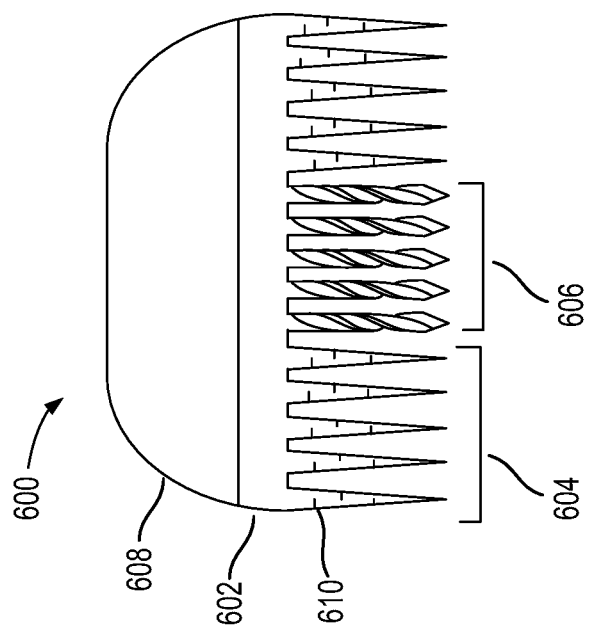
FIG. 6 illustrates an example apparatus having a prefilled compartment and a grouped teeth configuration with slotted teeth.

FIG. 6 illustrates an example apparatus having a prefilled compartment and a grouped teeth configuration with slotted teeth. Apparatus 600 includes base 602, straight teeth 604, twisted teeth 606, and enclosed compartment 608. One or more teeth, such as straight teeth 604, may include slots (e.g., slot 610).

Base 602 is shown connected to teeth of apparatus 600. In other implementations, base 602 can have other configurations, including a rectangular structure, for example. Base 602 includes teeth connected and arranged in a uniform manner extending from a portion of base 602. Particularly, the teeth of apparatus 600 include straight teeth, such as straight teeth 604, and twisted teeth, such as twisted teeth 606. In other examples of apparatus 600, the teeth can include more or less teeth, including different structured teeth.

Some teeth, such as straight teeth 604, as shown having horizontal slots (e.g., slot 610) extending inward towards an interior center of the teeth. The size, position, and other parameters of the slots may vary within examples. For instance, in an example implementation, twisted teeth 606 may include slots or other form of openings (e.g., an opening positioned on the end of each tooth).

Compartment 608 is shown in FIG. 6 connected to base 602. Particularly, compartment 608 is shown within the example illustration without an access point. As such, compartment 608 may be prefilled with a liquid or other mixture. For instance, compartment 608 may be prefilled with hair gel that flows through channels positioned in one or more teeth of apparatus 600 and out of slots positioned in given teeth during use of apparatus 600. Apparatus 600 may be configured to use various compartments configured to connect to base 602. In another implementation, compartment 608 may include an access point positioned not shown in FIG. 6, such as a location on compartment 608 that connects to base 602.

Figure 7:
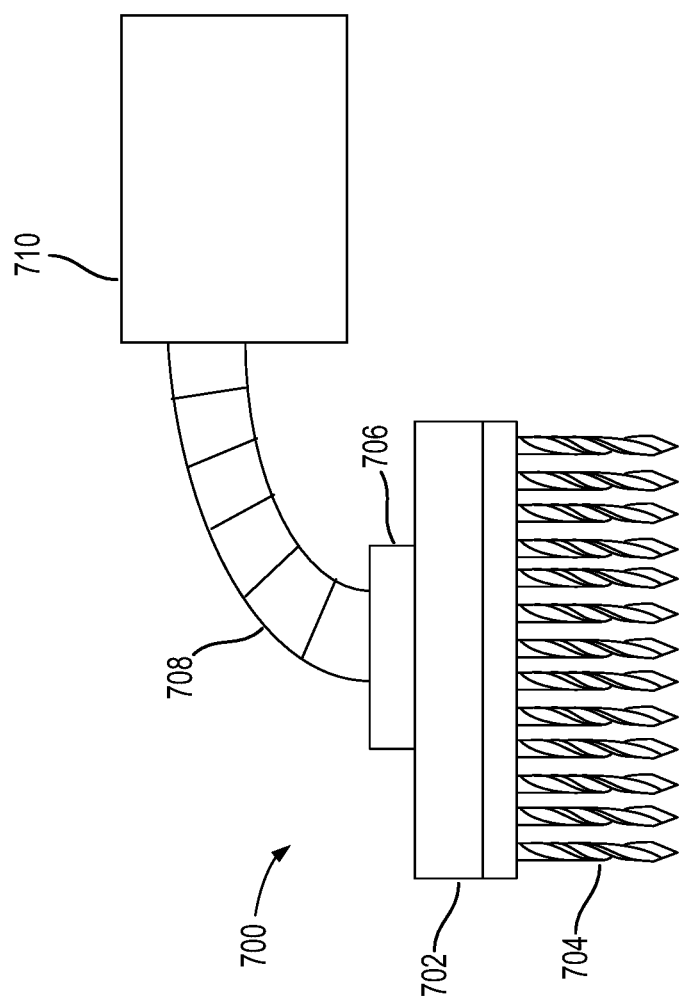
FIG. 7 illustrates an example apparatus attached to a vacuum component.

FIG. 7 illustrates an example apparatus configured with a vacuum component. Apparatus 700 includes base 702, twisted teeth (e.g., twisted tooth 704), connection point 706, tube 708, and vacuum component 710.

Apparatus 700 is shown in FIG. 7 having a similar configuration to apparatus 300 shown in FIG. 3, but further includes other components. For instance, apparatus 700 may include a handle in another example.

Base 702 is shown having twisted teeth connected at a bottom portion of base 702. Twisted teeth, such as twisted tooth 704, are shown in a full twisted configuration, but can have other configurations within other examples. For instance, apparatus 700 can include multiple types of teeth connected to base 702.

As shown, apparatus 700 includes vacuum component 710 connected to base 702 at connection point 706. This way, vacuum component 710 may use a suction effect to draw up debris and other objects located within fur or hair during use of apparatus 700 through tube 708 or other type of connection mechanism. Particularly, one or more teeth (e.g., twisted tooth 704) of apparatus 700 may include slots that enable a suction force from vacuum component 710 to remove and draw debris from the hair or fur during use of apparatus 700. Similarly, other portions of apparatus 700 can include openings that enable debris to transfer through apparatus 700 into vacuum component 710.

In other implementations, other components may connect to base 702 of apparatus 700 at connection point 706. For instance, a large bottle of shampoo or other liquid may connect to base 702 at connection point 706.

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A dispensing comb comprising:
    a base having a first compartment and a second compartment, wherein the first compartment includes first access point configured to receive a first liquid into the first compartment, and wherein the second compartment includes a second access point configured to receive a second liquid into the second compartment; and
    a plurality of teeth coupled to the base, wherein the plurality of teeth comprises:
        a first set of teeth, wherein each tooth in the first set of teeth is twisted along a length of the tooth to provide a spiral shape and each tooth includes an inner channel and one or more slots extending into the tooth in fluid communication with the inner channel; and
        a second set of teeth, wherein each tooth in the second set of teeth is straight or twisted along its length to provide a spiral shape and includes an inner channel and a plurality of slots in fluid communication with the inner channel, where the plurality of slots are spaced apart along a length of each tooth, and each slot of the plurality of slots of the second set of teeth are angled with respect to a longitudinal axis of the respective tooth, and each tooth of the second set of teeth provides at least two slots of the plurality of slots at different angles;
    wherein the inner channels and the one or more slots of the first set of teeth are in fluid communication with one of the first and second compartments for dispensing the respective first or second liquid onto a user's hair and the inner channels and one or more slots of the second set of teeth are in fluid communication with the other of the first and second compartments for dispensing the respective first or second liquid onto a user's hair.

2. The dispensing comb of claim 1, wherein the first access point is an opening and the comb further includes a removable cap configured to cover the opening.

3. The dispensing comb of claim 1, wherein the one or more slots are spaced incrementally on each tooth of the first set of teeth.

* * * * *